United States Patent [19]

Muller et al.

[11] Patent Number: 5,755,544
[45] Date of Patent: May 26, 1998

[54] DEVICE FOR RAPID SECUREMENT ON A SCREW-THREADED ROTATABLE DRIVE SHAFT

[75] Inventors: Patrice Muller, Chartres; Olivier Sauzay, Coudray, both of France

[73] Assignee: Muller BEM, Chartres Cedex, France

[21] Appl. No.: 731,322

[22] Filed: Oct. 15, 1996

[30] Foreign Application Priority Data

Oct. 12, 1995 [FR] France .................. 95 11968

[51] Int. Cl.⁶ .................................. F16B 37/08
[52] U.S. Cl. .................................. 411/433; 285/34
[58] Field of Search .................. 411/433, 432, 411/437, 349, 267, 300; 285/33, 34, 314

[56] References Cited

U.S. PATENT DOCUMENTS

| | | | |
|---|---|---|---|
| 1,761,157 | 6/1930 | Schillin | 285/34 |
| 2,001,244 | 5/1935 | Ezell | 285/34 |
| 2,267,252 | 12/1941 | Pitsch | 285/34 |
| 2,463,179 | 3/1949 | Iftiger | 285/34 |
| 2,736,227 | 2/1956 | Stroble . | |
| 4,531,872 | 7/1985 | Warkotsch | 411/433 |
| 4,768,909 | 9/1988 | Warkotsch . | |
| 4,930,961 | 6/1990 | Weis . | |

FOREIGN PATENT DOCUMENTS

| | | | |
|---|---|---|---|
| 501238 | 2/1951 | Belgium . | |
| 30851 | 10/1970 | Japan | 411/433 |

*Primary Examiner*—Flemming Saether
*Attorney, Agent, or Firm*—Young & Thompson

[57] ABSTRACT

A device for rapid securement on a screw-threaded drive shaft, such as a wheel balancer, includes a body 1 with at least one gripping handle 2. The body 1 is closed by a cover 3 and contains a resilient return spring 7 of a rotatable actuating member 8 adapted to radially displace two blocks 13 with screw-threaded combs for engaging the drive shaft. The actuating member and the two blocks are interconnected by a mounting with the aid of a groove 14 and a pin 15. Use for the rapid securement of bodies to be balanced on a balancer, e.g. a vehicle wheel.

16 Claims, 4 Drawing Sheets 5,755,544

DEVICE FOR RAPID SECUREMENT ON A SCREW-THREADED ROTATABLE DRIVE SHAFT

BACKGROUND OF THE INVENTION

The invention relates to a device for rapid securement on a screw-threaded rotatable drive shaft, particularly for a vehicle wheel balancer.

In this application, such devices for rapid securement are used to secure vehicle wheels to be balanced, by first pressing the rim of the vehicle wheel to be balanced onto a screw-threaded rotatable drive shaft then the rapid securement device is engaged in an open position to adjacent the rim; a resilient return means with two screw-threaded combs is then released into contact with the rotatable screw-threaded drive shaft and the rapid securement device is gripped by means of two external gripping handles.

In order rapidly to free the vehicle wheel after balancing, one proceeds in the reverse order by unlocking the securement device by means of the gripping handles, then a rotatable member is actuated that acts against the resilient return means to displace radially the screw-threaded combs into the open position and the rapid securement device is disengaged by pulling along the screw-threaded shaft for total extraction.

Such rapid securement devices are known in this field and are for example of the type described in U.S. Pat. No. 4,768,909. These known devices however have the drawback of not being easily unlockable in the gripped position and of having unbalanced movement of the screw-threaded combs or a movement which takes place along a path forming an angle with the cylinder circumscribed about the screw-threaded rotatable drive shaft: the approach toward contact until the gripping of the screw-threaded combs with the rotatable drive shaft thus takes place, either with lateral forces, or along an oblique path adapted to damage the screw threaded of the shaft after the repetition of numerous locking and unlocking cycles.

The invention has for its object to overcome the above drawbacks by providing a new rapid securement device in which the movement of the screw-threaded combs takes place according to a movement of radial translation without any substantial offset force during actuation of the rotatable actuating member acting against the resilient return means.

The invention has for its object a rapid securement device on a screw-threaded rotatable drive shaft, particularly for a balancer, comprising: a body with at least one gripping handle, closed by a cover, and containing a resilient return means for a rotatable actuating member adapted to displace radially two blocks forming screw-threaded combs, characterized in that the actuating member and the two blocks forming screw-threaded combs are interconnected by a balanced and substantially symmetrical mounting, so as to misplace the blocks with a movement of radial translation without any substantial offset force during actuation of said member.

According to other characteristics of the invention:

the actuating member has two guide strips each inserted in a groove in a block forming a screw-threaded comb and each by gripped between the bottom of the corresponding groove and a rod secured to the block, so as to press the rod radially outwardly during actuation of the member so as to cause radial spacing of the two blocks;

the guide strips are shaped to define a spiral path;

the guide strips are substantially rectilinear;

the guide strips are inclined relative to circles having for their center the center of rotation of the actuating member about an angle comprised between 15° and 40° of arc;

at least one gripping comb has a contour internally of which a trigger of the actuating member moves out of the way at least partially during rotation of the actuating member in the position corresponding to the spacing of the blocks forming screw-threaded combs;

the actuating member has a substantially radial configuration coming into abutment against a member secured to a screw-threaded block in the gripping position with the screw-threaded shaft;

the cover comprising two parts of a shape complementary to the blocks forming screw-threaded combs displaceable radially to define a substantially flat support surface for the actuating member during rotation of the latter;

the body comprises a bearing surface supporting the actuating member in a position substantially mid-height of the body.

BRIEF DESCRIPTION OF THE DRAWINGS

The invention will be better understood from the description which follows, given by way of non-limiting example, with reference to the accompanying drawings, in which.

DESCRIPTION OF PREFERRED EMBODIMENTS

Figure 1A:
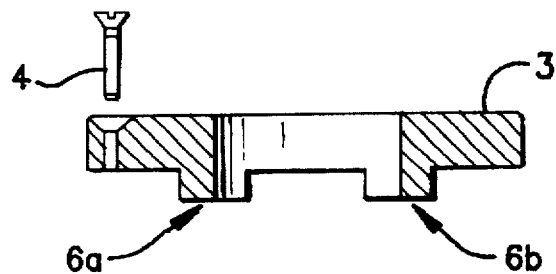
FIG. 1a is a vertical cross section of an embodiment of a cover of the present invention.
Figure 1B:
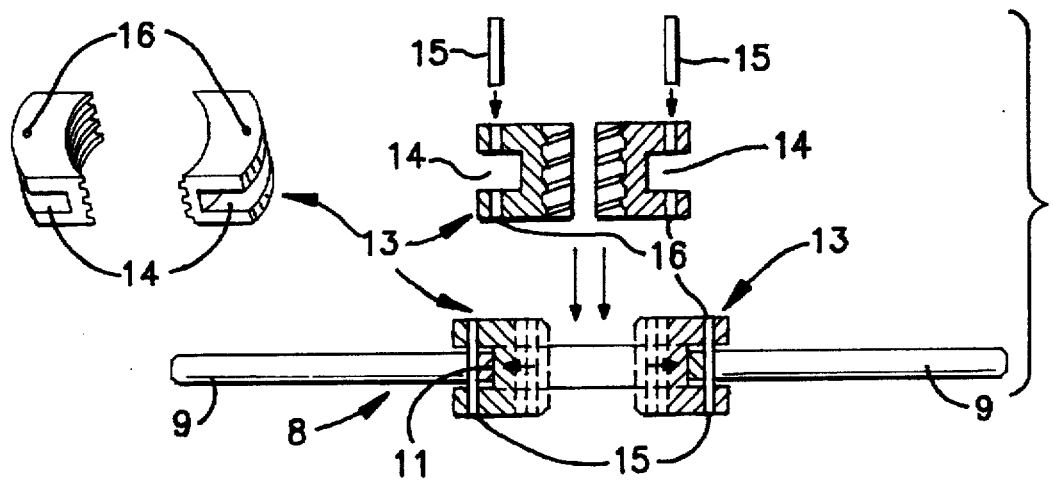
FIG. 1b is an illustration in perspective and partial cross section of phases of assembly of an embodiment of an actuating device of the present invention.
Figure 1C:
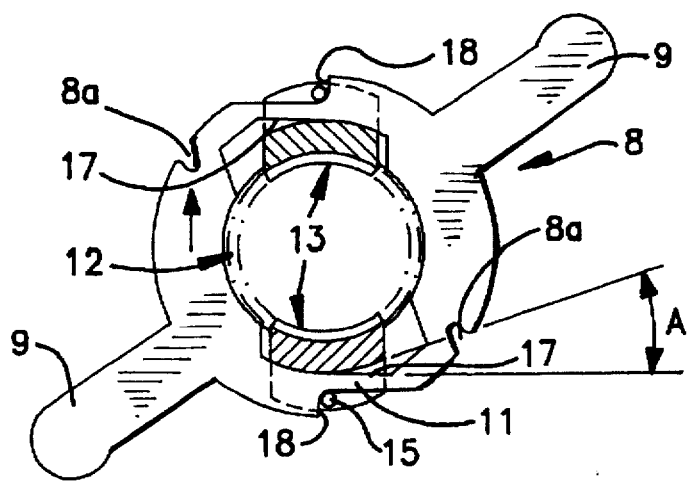
FIG. 1c is a plan view of an embodiment of the actuating device of FIG. 1b.
Figure 1D:
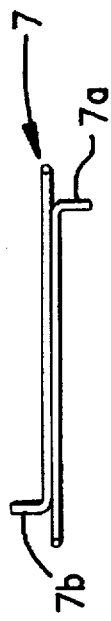
FIG. 1d is an illustration of an embodiment of a resilient return spring of the present invention.
Figure 1E:
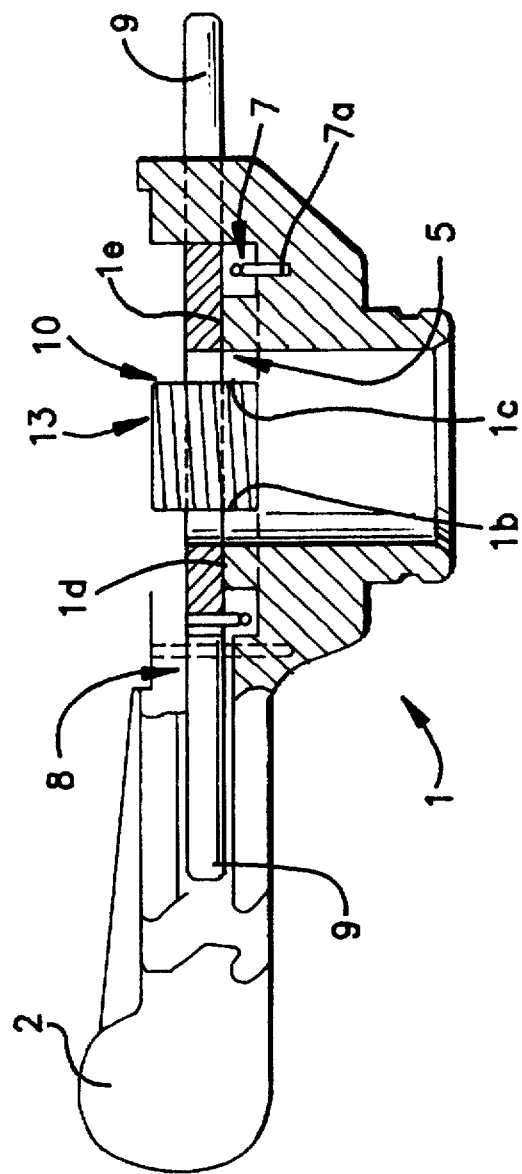
FIG. 1e is a partial vertical cross section of an embodiment of the assembled device of FIGS. 1a–1d.
Figure 2:
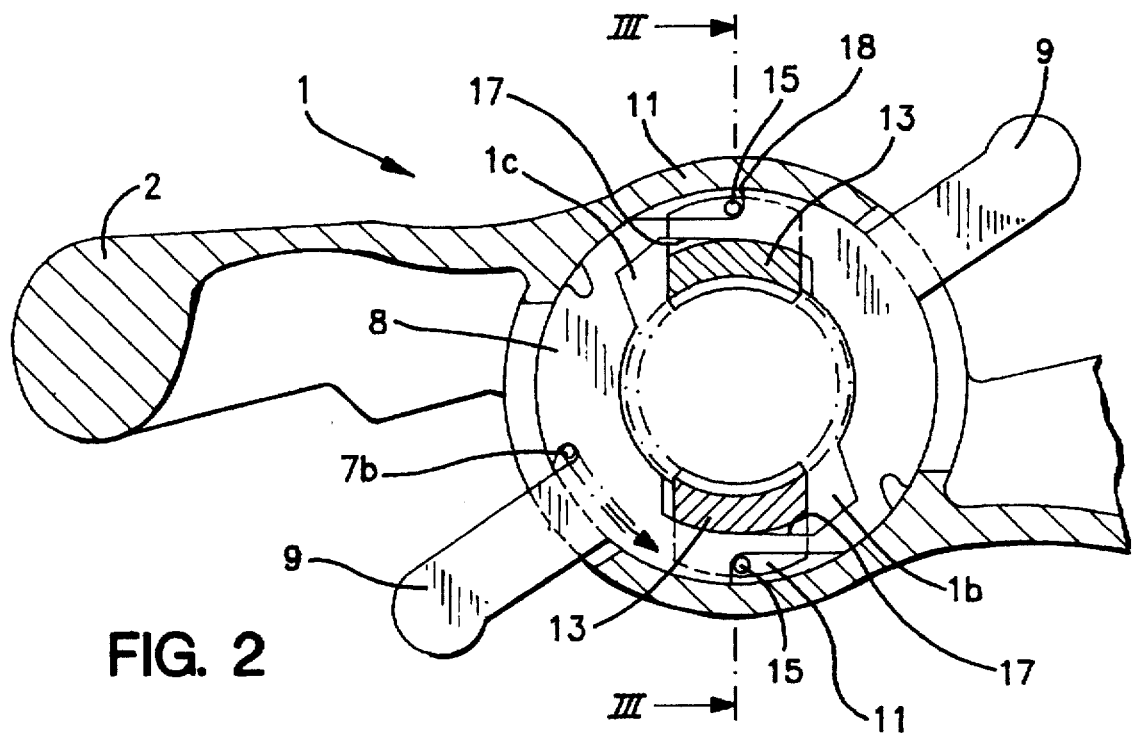
FIG. 2 shows schematically a view partially cut away along the line II—II of FIG. 3, of a device according to the invention in the rest and closed position.
Figure 3:
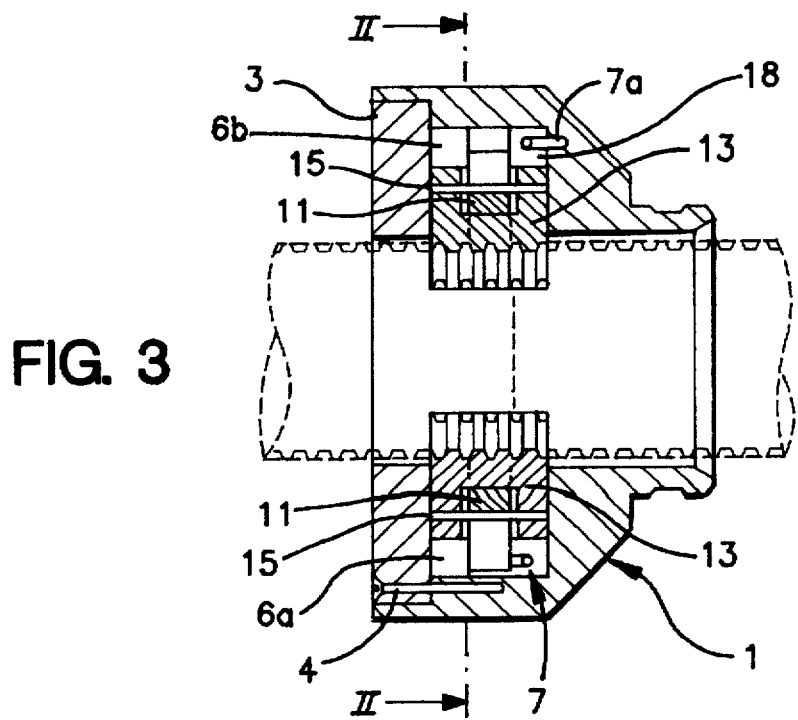
FIG. 3 shows schematically a partial cross-sectional view on the line III—III of FIG. 2, of a device according to the invention in the rest and closed position.
Figure 4:
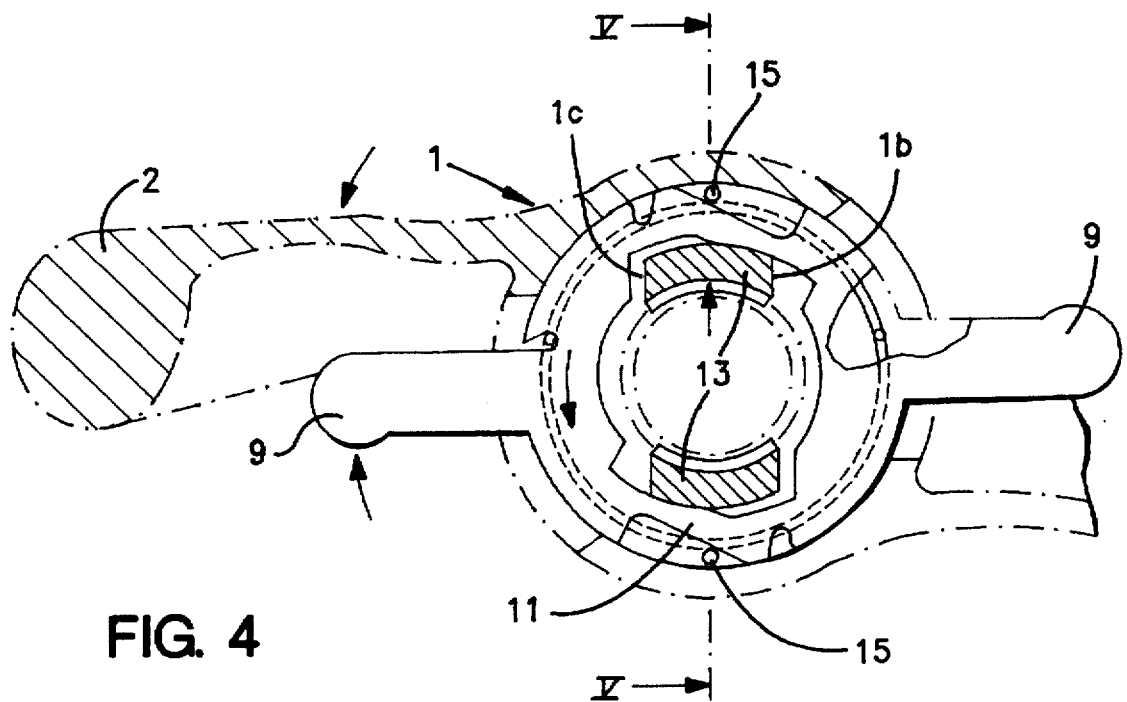
FIG. 4 shows schematically a view of a partial cross section on the line IV—IV of FIG. 5, of a device according to the invention in the starting and open position.
Figure 5:
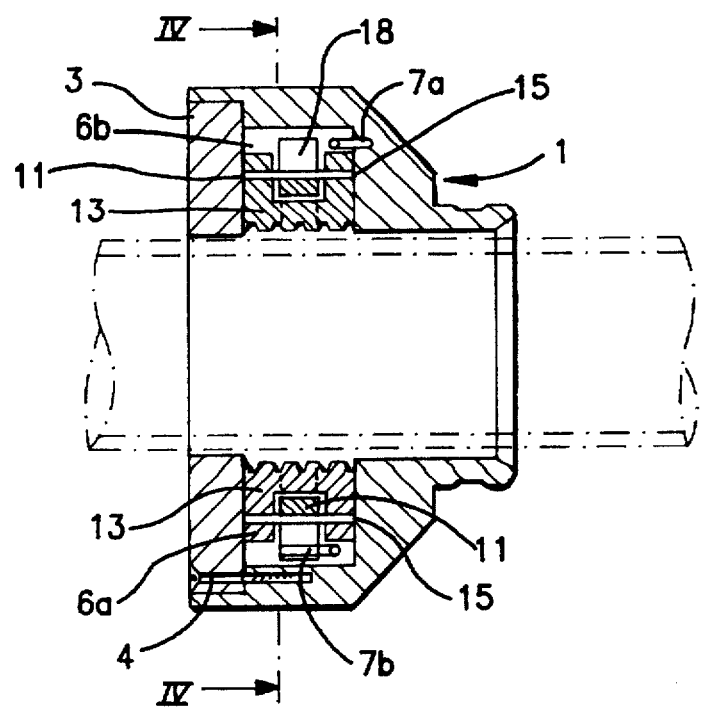
FIG. 5 shows schematically a view in cross section on the line V—V of FIG. 4, of a device according to the invention in the starting and open position.

With reference to FIGS. 1a–1c and 2 to 5, identical reference numerals designate identical or functionally equivalent elements among the various views.

The rapid securement device comprises a body 1 having two gripping handles 2 and a cover 3 for closing the body secured by means of screw 4 or equivalent means. The body 1 comprises an annular bearing surface 5 located substantially at mid-height of the body 1, while the cover 3 has relief portions 6a and 6b engaging with the interior of the body 1.

Resilient return means, for example a spiral spring 7, is provided to return the actuating member 8 into a predetermined position relative to the body 1. The spring 7 is engaged by its bent end 7a in an opening of the body and by another bent end 7b in an opening 8a of the actuating member 8.

The actuating member 8 comprises two diametrically opposed triggers 9 which extend after mounting through openings 10 provided in the body 1, two guide strips 11, a central opening 12 whose shape corresponds to free passage for the screw-threaded rotatable drive shaft of the balancer and to the displacement of the screw-threaded segments adapted to coact with this rotatable drive shaft. The actuating member 8 is machined preferably from sheet metal of reduced thickness, so as to be substantially symmetrical relative to its axis of rotation during actuation.

Two blocks 13 are machined to form screw-threaded combs on the radial internal surface and each has a groove 14 substantially at mid-height of each block 13, while pins 15 are provided to engage in openings 16 passing through radially external portions of the blocks 13 after assembly.

According to the invention, the actuating member 8 and its two blocks 13 forming screw-threaded combs are secured together by a mounting which is balanced and substantially symmetrical relative to the axis of rotation of the actuating member after assembly: to this end, guide strips 11 are engaged in grooves 14 of the blocks 13 and each guide strip 11 is secured to the bottom of each groove 14 by the engagement of a pin 15 in an opening 16.

During opening movement by actuation of the triggers 18 against the spring 7, the guide strips 11 press the rods 15 radially externally and give rise to radial spacing of the two blocks 13, which move with a movement of pure radial translation limited laterally by two walls 1b and 1c of the body 1. The actuating member 8 imposes no substantial offset force against the movement of blocks 13, because each internal surface 17 limiting the guide strip 11 is shaped to define a regular and continuous path. Preferably, the shape of the surface 17 defines a spiral path or alternatively comprises a substantially rectilinear guide strip. In this case, the guide strips 11 are inclined relative to the circles having for their center the center of rotation of the actuating member 8 about an angle A comprised between 15° and 40° of arc, preferably comprised between 23° and 30° of arc.

According to a preferred embodiment, each trigger 9 of the actuating member 8 moves out of the way at least partially within the contour of each adjacent gripping handle 2. This permits bringing the triggers toward each other and simultaneously keeping the triggers 9 and the handles 2 readily at hand during emplacement and retraction of the actuating device. During gripping or ungripping, force is exerted on the end of the handles 2 while not bearing against the triggers 9, then, after gripping or ungripping, it suffices simply without changing the position of the hands, to press against the triggers 9 to extract or engage rapidly the securement device according to the invention. The natural movement of gripping and application of force is thus carried out at a continuous manner without tiring one's self, contrary to the use of the device of the prior art, which requires separate action of the thumb which is tiresome after numerous cycles of gripping and ungripping during the same working day.

The actuating member 8 has at the end corresponding to the closing of the device and to the engagement on the screw-threaded shaft, a substantially radial configuration 18 coming into abutment against a pin 15 of a screw-threaded block 13 when the combs 13 are in engagement with the screw-threaded rotatable drive shaft. This arrangement provides a reproducible stopping of the actuating member 8 against its combs 13.

Moreover, the absence of force applied to the actuating member 8 by reason of the balanced and symmetrical arrangement of the movable members, permits reducing the thickness of the member 8, given that this member is maintained substantially at mid-height of the body 1 by substantially flat bearing surfaces. A first bearing surface is supplied by the relief portions 1d and the complements of the body 1, while a second bearing and support surface for the actuating member 8 is supplied by the surfaces limiting the relief portions 6a and 6b of the cover 3. Thus, the actuating member 8 is supported substantially at mid-height of the body on opposite sides by flat supports which avoid any distortion of the actuating member 8 during its rotation by triggers 9.

Except for the movable combs, which are necessarily of metal, and the spiral springs 7 of spring steel, it is possible to produce the other members such as the body 1, the cover 3 and if desired the actuating member 8, from plastic material of the polyamide type or the like, which permits lightening considerably the securement device according to the invention.

The invention described with reference to a particular embodiment is not thereby limited but covers on the contrary all modifications of shape and all variations of embodiment within the scope and spirit of the invention.

What is claimed is:

1. In a device for rapid attachment to a screw-threaded rotatable drive shaft, the device having a shaft mounting body with at least one gripping handle, an actuating member rotatable about an axis of the body, two movable blocks that have screw-threaded combs adapted to engage the screw-threaded drive shaft, and a spring biasing a rotation of the actuating member about the axis of the body and for radially displacing the two blocks, the improvement comprising a mount engaging the actuating member with the two blocks at a mid-height of the two blocks.

2. The improved device of claim 1, wherein said mount comprises a groove in a radially exterior surface of each of the blocks, a center plane of said groove being at the mid-height of the blocks of the blocks.

3. The improved device of claim 2, wherein the mount further comprises guide strips on a radially interior surface of the actuating member, said guide strips engaging respective ones of said grooves.

4. The improved device of claim 3, wherein the mount further comprises two rods, each engaging one of said guide strips and respective adjacent side walls of said grooves, wherein said guide strips push said rods radially outwardly during rotation of the actuating member to cause the blocks to be displaced radially outwardly.

5. The improved device of claim 3, wherein said guide strips define a radially spiral path.

6. The improved device of claim 3, wherein said guide strips have a rod-engaging surface that follows a straight path.

7. The improved device of claim 6, wherein said straight path is tangential to a radially exterior surface of the blocks.

8. The improved device of claim 1, wherein said mount comprises guide strips on a radially interior surface of the actuating member, said guide strips being in a plane of the handle of the body.

9. The improved device of claim 1, wherein said mount comprises a groove in a radially exterior surface of each of the blocks, a center plane of said groove being in a plane of the handle of the body.

10. The improved device of claim 1, wherein said mount comprises guide strips on a radially interior surface of the actuating member and a corresponding groove in a radially exterior surface of each of the blocks.

11. The improved device of claim 10, wherein the mount further comprises two rods, each engaging one of said guide strips and respective adjacent side walls of said grooves.

12. The improved device of claim 11, wherein the actuating member comprises a radial face that engages one of said rods when the blocks are engaged with the shaft.

13. The improved device of claim 10, wherein said guide strips are inclined 15° to 40° relative to a line perpendicular to a radius through a center of one of the blocks.

14. The improved device of claim 1, wherein the actuating member has a radially extended grip that is coplanar with and fits at least partially within the handle of the body when the blocks are disengaged from the shaft.

15. The improved device of claim 1, further comprising a cover with an axially extended portion that abuts a radially exterior surface of the blocks and abuts an axial surface of the actuating member.

16. The improved device of claim 1, wherein the body comprises a bearing surface supporting the actuating member at an axial mid-point of the handle.

* * * * *